United States Patent [19]
Burke

[11] Patent Number: 5,525,315
[45] Date of Patent: Jun. 11, 1996

[54] PROCESS FOR REMOVING HEAVY METAL IONS WITH A CHELATING CATION EXCHANGE RESIN

[75] Inventor: W. Andrew Burke, Bass River, Mass.

[73] Assignee: Shipley Company, L.L.C., Marlborough, Mass.

[21] Appl. No.: 163,896

[22] Filed: Dec. 7, 1993

[51] Int. Cl.⁶ ..................................... B01D 15/04
[52] U.S. Cl. .............................. 423/24; 423/54; 423/100; 423/139; 423/DIG. 14; 210/688
[58] Field of Search ..................... 423/DIG. 14, 139, 423/24, 54, 100; 210/688, 675

[56] References Cited

U.S. PATENT DOCUMENTS

| | | | |
|---|---|---|---|
| 3,316,171 | 4/1967 | Mastrorilli | 423/DIG. 14 |
| 4,033,909 | 7/1977 | Papa | 423/DIG. 14 |
| 4,370,240 | 1/1983 | Brownell et al. | 210/673 |
| 4,895,905 | 1/1990 | Schneider et al. | 423/24 |
| 4,946,595 | 8/1990 | Miller, Jr. | 210/758 |
| 5,073,622 | 12/1991 | Wojtech et al. | 423/DIG. 14 |
| 5,108,615 | 4/1992 | Hosea et al. | 423/139 |
| 5,300,628 | 4/1994 | Honda | 210/660 |
| 5,378,802 | 1/1995 | Honda | 210/681 |

FOREIGN PATENT DOCUMENTS

| | | |
|---|---|---|
| 1228560 | 9/1989 | Japan . |
| 5234877 | 9/1993 | Japan . |
| 5234876 | 9/1993 | Japan . |
| 93/12152 | 12/1991 | WIPO . |

OTHER PUBLICATIONS

Translation of Japan 1–228,560.

*Primary Examiner*—Steven Bos
*Attorney, Agent, or Firm*—Robert L. Goldberg

[57] ABSTRACT

The invention is for a process of removal of dissolved heavy metal cation contaminants from an organic solution. The process of the invention involves providing a chelating ion exchange resin modified by removal of sodium ions therefrom and contacting said organic solution with said modified exchange resin for a time sufficient to remove ionic metal impurities. The invention is useful for removal of ionic contaminants from organic solutions requiring high purity.

11 Claims, No Drawings

PROCESS FOR REMOVING HEAVY METAL IONS WITH A CHELATING CATION EXCHANGE RESIN

BACKGROUND OF THE INVENTION

1. Introduction

This invention relates to removal of dissolved contaminants from organic solutions. More particularly, this invention relates to removal of dissolved metallic contaminants from organic solutions used in integrated circuit manufacture.

2. Description of the Prior Art

Ultra pure liquids free of particulate, ionic and organic contamination are required for many industrial purposes such as for the manufacture of pharmaceutical and integrated circuits. For example, in the manufacture of high resolution integrated circuits, it is known that many processing liquids come into contact with a bare wafer or a resist coated surface. These include photoresists and treatment chemicals such as organic liquids and aqueous solutions which contain acids, bases, oxidants, and other proprietary ingredients. At least 15 to 50 liquids of various compositions are used to clean wafers, prime surfaces, deposit resists or other polymers, develop, rinse, etch, and strip the resist. It is known that these solutions may be a source of contamination of the integrated circuit wafer that may interfere with its performance. Thus, the reduction or removal of insoluble and soluble contaminants from processing fluids used for the production of integrated circuits before or during use is basic insurance for prevention of damage to the integrated circuit.

Photoresist coating compositions are used extensively in integrated circuit manufacture. Such compositions typically comprise a light-sensitive component and a polymer binder dissolved in a solvent. Typical photoresist compositions are disclosed in U.S. Pat. Nos. 5,178,986; 5,212,046; 5,216,111; and 5,238,776, each incorporated herein by reference for disclosure of photoresist compositions, processing, and use.

It is known that photoresist coating compositions contain particulate and ionic contaminants. For example, it is known that solid gels or insolubles form in photoresists due to dark reactions. In addition, soluble impurities such as moisture, silicone oils, plasticizers, and metal ions may be present from the manufacture of the resist components and from the packaging containers or dispensing tanks. Trapped bubbles from point-of-use filtration or the shaking of a resist bottle prior to dispensing can lead to defects in resist coatings. In Class 100 clean rooms, airborne particulate counts amount to 3 particles per liter of density of 2. By comparison, liquids contain about 100,000 particles per liter. A particle count of 100,000 per liter seems high, but if translated into a solid of 0.6µ in size, this is equivalent to 10 parts per million parts of solution (ppm). A level of 10 ppm amounts to the deposition of 10 mg per liter. Since liquids are heavily contaminated compared to clean room air, effective contaminant removal is essential to the manufacture of such devices.

Ultrafiltration of resist liquids has progressed and manufacturers of resist now supply resist materials filtered through 0.04 µM diameter absolute filters. However, methods for removal of particulates from treatment solutions are not effective for removal of dissolved contaminants from solution such as organic impurities and ionic species. These contaminants can be at least as damaging to an integrated circuit as particulate contamination.

Efforts to remove dissolved cationic and anionic contaminants from treatment solutions used to manufacture integrated circuits are known in the art. For example, one such method is disclosed in International Publication No. WO 93/12152, incorporated herein by reference, which is directed to removing metal ions such as sodium and iron from novolak resins during manufacture. The process comprises cation exchange treatment whereby a cation exchange resin is first washed with a mineral acid solution to reduce the level of total sodium and iron ions within the exchange resin to preferably less than 100 ppb, passing a formaldehyde reactant through the so treated cation exchange resin to decrease the sodium and iron ion content to less than 40 ppb, passing a phenolic compound through the cation exchange resin to decrease its sodium and iron ion content to less than 30 ppb, and then condensing the so treated phenolic compound with formaldehyde in the presence of an acid catalyst to form the resin.

A method for removal of dissolved ionic metals and non-metals from a photoresist is disclosed in published Japanese Patent Application No. 1228560 published Sep. 12, 1989, incorporated herein by reference. In accordance with the procedures of this patent, a photosensitive resin is passed through a mixed bed of a cation exchange resin and an anion exchange resin to simultaneously remove cation and anionic species from the photoresist solution.

In copending U.S. patent application Ser. No. 08/128,994, filed Sep. 30, 1993, assigned to the same assignee as the subject application and incorporated herein by reference, an improved process is disclosed for removing metallic cations from organic solutions using modified cation exchange resins. In accordance with the process of the invention disclosed therein, the cation exchange resin is modified by replacement of the acid protons on the cation exchange groups with essentially neutral groups such as ammonium or amine groups. Thereafter, an organic solution containing acid labile components may be treated with the modified cation exchange resin to remove metal ions without the formation of undesired by-products caused by attack of acid protons on acid labile groups.

The process described in the above-identified copending application is suitable for the removal of dissolved cations from solutions containing an acid labile solution. However, the process is especially useful for removing mobile metal ions such as sodium and potassium from such solutions but is somewhat less effective in removing heavier metal ions such as iron and chromium.

SUMMARY OF THE INVENTION

In accordance with the invention, a process is provided whereby organic solutions are treated to remove large concentrations of dissolved heavy metal ions therefrom using chelating cation exchange resins. The process comprises providing a cation exchange resin having chelating groups on the resin, treating the resin with an acid, to replace sodium ions typically associated with such resins with a hydrogen proton, and contacting the organic solution with said resin to remove dissolved metallic contaminants.

Treatment of the chelating cation exchange resin with an acid results in replacement of the sodium ions from the exchange groups thereby preventing contamination of the solution to be treated with the more mobile sodium ions. The removal of sodium ions from the resin is especially important for the purification of organic solutions containing dissolved components used in the formulation of compositions to be used in integrated circuit manufacture.

DESCRIPTION OF THE PREFERRED EMBODIMENTS

The process of the invention is applicable to many organic solutions containing dissolved contaminants but is especially useful for treating solutions containing photoresist components containing dissolved metal contaminants in ionic form, especially heavy metal contaminants. Accordingly, the description that follows will for the most part exemplify purification procedures for photoresist components, especially polymers used to formulate photoresists, but the invention should not be construed as limited to this embodiment.

Photoresists are well known and described in numerous publications including DeForest, Photoresist Materials and Processes, McGraw-Hill Book Company, New York, Chapter 2, 1975 and Moreau, Semiconductor Lithography, Principles, Practices and Materials, Plenum Press, New York, Chapters 2 and 4, 1988, incorporated herein by reference.

Suitable positive-working photoresists typically contain two components—a light-sensitive compound and a film-forming polymeric binder where the light-sensitive component undergoes photochemical alteration upon exposure. Single component systems are known and typically comprise a polymer that undergoes chain scission upon exposure. The light-sensitive compounds most frequently used in two-component resist systems are esters formed from o-quinone diazide sulfonic acids, especially sulfonic acid esters of naphthoquinone diazides. These esters are well known and described by DeForest, supra, pages 47–55 and by Moreau, supra, pages 34–52. The light-sensitive compounds and the methods used to make the same are all documented in prior patents including U.S. Pat. Nos. 3,046,110; 3,046,112; 3,046,119; 3,046,121; 3,106,465; 4,596,763; and 4,588,670, all incorporated herein by reference.

The polymer binders most frequently used for positive-working photoresists in conjunction with o-quinone diazides are the alkali soluble phenol formaldehyde resins known as the novolak resins. Photoresists using such polymers are illustrated in U.S. Pat. Nos. 4,377,631 and 4,404,272. Another class of binders used with o-quinone diazides are homopolymers and copolymers of vinyl phenol. Photoresists of this nature are disclosed in U.S. Pat. No. 3,869,292. The process of the subject invention is especially useful for the purification of the phenolic polymers used to formulate positive-working photoresists.

Negative-working resists and the components thereof may also be treated in accordance with the invention and are well known in the art. Such photoresists typically undergo random crosslinking upon exposure to activating radiation thereby forming areas of differential solubility. Such resists often comprise a polymer and a photoinitiator. One class of negative-working resists comprises, for example, polyvinyl cinnamates as disclosed by R. F. Kelly, Proc. Second Kodak Semin. Micro Miniaturization, Kodak Publication P-89, 1966, p. 31. Other negative-acting resists include polyvinylcinnamate acetates as disclosed in U.S. Pat. No. 2,716,102; azide cyclized rubber as disclosed in U.S. Pat. No. 2,940,853; polymethylmethacrylate/tetraacrylate as disclosed in U.S. Pat. No. 3,149,975; polyimide-methyl methacrylate as disclosed in U.S. Pat. No. 4,180,404; and polyvinyl phenol azide as disclosed in U.S. Pat. No. 4,148,655.

Another class of photoresists for purposes of the invention are those positive and negative acid-hardening resists disclosed in EPO application Ser. No. 0 232 972 in the name of Feely et al. These photoresists comprise an acid-hardening resin and a halogenated, organic, photoacid generating compound.

Substantially all components of the photoresist composition are a potential source of dissolved metallic contaminants that can deleteriously effect performance of an integrated circuit. Typical dissolved metal contaminants include sodium, potassium, iron, copper, chromium, nickel, molybdenum, and zinc. While it is known to treat photoresist solutions and solutions of photoresist components with exchange resins to remove dissolved metals, it is also known that conventional ion exchange processes for removal of such contaminants are not suitable for reduction in the concentration of the metallic contaminants to the extent necessary for the manufacture of integrated circuits—i.e. to amounts less than 100 parts per billion parts of solution (ppb) and preferably to levels of less than 25 ppb.

The process of the invention comprises provision of a chelating cation exchange resin capable of chelating with heavy metal ions, modifying said ion exchange resin to replace sodium with a hydrogen proton and contact of the organic solution to be treated with said modified ion exchange resin. The process of the invention is less effective in removal of the more mobile metal ions such as potassium and sodium ions and it may be desirable to treat the solutions containing both mobile metal ions and heavy metal ions with the chelating ion exchange resin of the invention and another ion exchange resin capable of removing mobile metal ions such as the modified cation exchange resins as disclosed in the above referenced copending U.S. patent application Ser. No. 08/128,994, filed Sep. 30, 1993.

Chelating cation exchange resins are known and described in numerous publications. For example, suitable exchange materials are disclosed by Samuelson, Ion Exchange Separation in Analytical Chemistry, John Wiley and Sons, New York, 1963, pp 33, 69, 87, and 88, and in the Meyers, Encyclopedia of Physical Science and Technology, Second Edition, Harcourt Brace Jovanovich, San Diego, 1992, Volume 3, pp 363 to 367, each incorporated herein by reference. Typical chelating exchange resins are polyamines on polystyrene, polyacrylic acid and polethyleneimine backbones, thiourea on polystryene backbones, quanidine on polystryene backbones, dithiocarbamate on a polyethyleneimine backbone, hydroxamic acid on a polyacrylate backbone, mercapto on polystyrene backbones, and cyclic polyamines on polyaddition and polycondensation resins. Preferred chelating exchange resins for purposes of this invention are styrene-divinylbenzene copolymers having iminodiacetate groups where two carboxyl groups and the tertiary nitrogen give the resin a chelating capability. Such resins are commercially available as Dow Chelex 100 and Dowex A-1 both available from Dow Chemical Company, Diaion CR-10 available from Mitsubishi, Unicellex UR-10 available from Unitica Chemical, Lewatit TP-207 available from Bayer Corporation and as Amberlite IRC-718 from Rohm and Haas Company. The most preferred embodiment of the invention is the treatment of a resin used to form a photoresist with Amberlite IRC- 718 acidified with hydrochloric acid.

The chelating cation exchange resins are typically available in the form of a sodium salt. As discussed above, the sodium ion must be removed from the resin prior to its use to prevent sodium from entering the organic solution treated with the resin. This is accomplished by rinsing the resin with an acid. Though mineral acids may be used, weaker organic acids are also suitable. Accordingly, the acid may be any of hydrochloric acid, formic acid, acetic acid, propionic acid, butyric acid, oxalic acid, succinic acid, sulfuric acid, nitric acid, etc.

The chelating ion exchange resin is desirably treated to remove sodium ions by rinsing with an aqueous solution of any of the above acids. The solution used to rinse the exchange resin may contain the acid in a concentration of from 1 to 25 percent by weight and more preferably in a concentration of from 2 to 10 percent by weight. Treatment conditions are not critical and it is sufficient to pass the treatment solution through a bed of the exchange material in a column or to slurry the treatment solution with the exchange resin. Contact time between exchange material with the treatment solution may vary between about 1 and 30 hours, more preferably, from about 1 to 10 hours. In general, the treatment time is sufficient to provide an exchange resin having a pH varying between about 1 and 6 and more preferably between about 1 and 4. Finally, the treated resin is preferably dehydrated by washing the resin with an aqueous miscible organic solvent such as ethyl lactate, acetone or a solvent common to the solution to be purified. The procedure can be performed at room or elevated temperature though elevated temperatures result in increased exchange efficiency, but with possible concomitant degradation of temperature sensitive materials.

Organic solutions are treated with the modified ion exchange resins by slurrying the same with the resin or by passing the solution through a column of a modified exchange resin. The rate of passage of the solution through the column can vary between about 2 and 20 bed volumes per hour. Ambient conditions are suitable.

EXAMPLE 1

A chelating ion exchange resin identified as Amberlite® IRC-718 available from Rohm and Haas Company was prepared for use in a column. A 500 gram quantity of novolak resin was divided into approximately equal portions. Each resin portion was washed with 500 ml of distilled water, stirred as a slurry, allowed to settle, and decanted. This water wash was repeated for a total of three times. The resin was poured as a water slurry into a 2.5 cm diameter column with a height of 1 meter. The resin bed was then rinsed with a solution consisting of 5 parts concentrated HCl and 95 parts distilled water. The HCl solution was passed through the column at a flow of approximately 1 bed volume per hour. Seven bed volumes of acid solution were sufficient to reach pH steady state defined as the pH of effluent equal to pH of acid solution of approximately 1.1. The column was then flushed with deionized water to remove residual chloride and to raise the pH to approximately 2–3. The column was then dehydrated with the base solvent of the resin solution to be purified. Dehydration was considered complete when the effluent solvent had a moisture content of less than 0.5%. Flow rate of solvent through the column was similar to that used during the acidification step.

EXAMPLE 2

A solution of cresylic aldehyde novolak resin was prepared at 30% solids by weight. Approximately 3.41 kg of dry resin powder was added to 7.95 kg of a mixed solvent system containing 90% ethyl lactate and 5% each of xylene and n-butyl acetate. The mixture was agitated until dissolution was complete. The resulting solution had a viscosity of 30.5 centistokes. Approximately 40 g of chelating resin prepared as in Example 1 was added to a bottle containing 218 g of the novolak resin solution resulting in a pH of 2.6. The bottle was mechanically rolled for 20 hours and the solution was 0.2 µM filtered. Iron content was 150 ppb in the starting material and 50 ppb after the batch processing.

EXAMPLE 3

A solution with component ratios as in Example 2 was prepared using 100% ethyl lactate as the solvent. The resulting resin solution had a pH of 3.7. A 0.2 µM polypropylene filter was placed in line prior to a single column as prepared in Example 1. The solution was processed through the filter and column at an approximate flow rate of one bed volume per hour. Iron content of the solution was reduced from a starting level of 155 ppb to a post process of 40 ppb.

EXAMPLE 4

A solution was prepared as in Example 2 and was passed through a 0.2µM filter. It was then processed using two chelating ion exchange columns, connected in series, as prepared in Example 1. Metal ion reduction was: iron from 190 ppb to 60 ppb, aluminum from 80 ppb to 30 ppb, nickel from 120 ppb to detection limit of <10 ppb, and zinc from 140 ppb to 30 ppb.

EXAMPLE 5

A solution prepared as in Example 2 was passed through a 0.2 µM filter. It was then processed using two chelating ion exchange columns, connected in series, as prepared in Example 1. Metal ion reduction was: iron from 160 ppb to 20 ppb, aluminum from 100 ppb to 25 ppb, calcium from 50 ppb to 25 ppb, and chromium from 80 ppb to 20 ppb.

I claim:

1. A process for removing heavy metal ions contained in an organic solution of one or more photoresist components, said process comprising the steps of providing a chelating cation exchange resin, washing said chelating cation exchange resin with an acid to remove essentially all sodium ions therefrom and rinsing said acid washed chelating cation exchange resin with water where in the water effluent has a pH varying between about 1 and 6, and contacting said organic solution containing said heavy metal ions with said acid washed chelating cation exchange resin, the contact between the solution and the chelating cation exchange resin being for a time sufficient to reduce the concentration of said heavy metal ions contained in said organic solution.

2. The process of claim 1 where the acid used to prepare the chelating cation exchange resin is selected from the group consisting of hydrochloric acid, formic acid, acetic acid, carbonic acid, propionic acid, butyric acid, malonic acid, succinic acid, citric acid, and lactic acid.

3. The process of claim 1 where the acid is acetic acid.

4. The process of claim 1 where the organic solution is a solution of a photoresist containing a dissolved photoactive component and an organic polymer binder.

5. The process of claim 1 where the organic solution is a solution of an organic polymer.

6. The process of claim 5 where the polymer is a novolak resin.

7. The process of claim 1 where the chelating cation exchange resin is a styrene-divinylbenzene copolymer having iminodiacetate groups.

8. The process of claim 1 where the chelating cation exchange resin comprises a polyamine on a polymer backbone selected from the group consisting of polystyrene, polyacrylic acid, and polethylene imine.

9. The process of claim 1 where the chelating cation exchange resin comprises thiourea on a polystyrene backbone.

10. A process for removing heavy metal ions contained in an organic solution of a novolak resin, said process comprising the steps of providing a chelating cation exchange resin that is a styrene-divinyl benzene copolymer having imino diacetate groups, washing said chelating cation exchange resin with an acid, and contacting said organic solution containing said dissolved heavy metal ions with said acid washed chelating cation exchange resin, the contact between the solution and the chelating cation exchange resin being for a time sufficient to reduce the concentration of said heavy metal ions contained in said orgarnic solution.

11. The process of claim 10 including the step of washing said acid washed chelating exchange resin with water whereby the water effluent has a pH varying between about 1 and 6 prior to contacting said organic solution with said chelating cation exchange resin.

* * * * *